US008503308B1

(12) United States Patent
Oroskar et al.

(10) Patent No.: US 8,503,308 B1
(45) Date of Patent: Aug. 6, 2013

(54) PAGE ROUTING SYSTEM

(75) Inventors: Siddharth S. Oroskar, Overland Park, KS (US); Sachin R. Vargantwar, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 281 days.

(21) Appl. No.: 12/916,027

(22) Filed: Oct. 29, 2010

(51) Int. Cl.
*H04J 1/16* (2006.01)
(52) U.S. Cl.
USPC .......................................... 370/237; 370/229
(58) Field of Classification Search
None
See application file for complete search history.

(56) References Cited

U.S. PATENT DOCUMENTS

| | | | |
|---|---|---|---|
| 5,327,426 A | 7/1994 | Dolin, Jr. et al. | |
| 5,621,784 A * | 4/1997 | Tiedemann et al. | 455/435.1 |
| 5,826,172 A | 10/1998 | Ito et al. | |
| 6,381,458 B1 * | 4/2002 | Frodigh et al. | 455/442 |
| 6,597,904 B1 | 7/2003 | Neustein | |
| 6,731,944 B1 | 5/2004 | Ostrup et al. | |
| 6,823,191 B2 | 11/2004 | Laroia et al. | |
| 6,859,440 B1 | 2/2005 | Sonti et al. | |
| 6,865,398 B2 | 3/2005 | Mangal et al. | |
| 6,980,818 B2 * | 12/2005 | Harris et al. | 455/466 |
| 7,480,510 B1 * | 1/2009 | Woleben et al. | 455/453 |
| 8,116,761 B1 * | 2/2012 | Singh et al. | 455/426.1 |
| 2002/0168983 A1 * | 11/2002 | Kumaran et al. | 455/446 |
| 2003/0181214 A1 | 9/2003 | Grob et al. | |
| 2004/0002340 A1 | 1/2004 | Lim et al. | |
| 2004/0157626 A1 | 8/2004 | Park et al. | |
| 2005/0009534 A1 * | 1/2005 | Harris et al. | 455/453 |
| 2005/0181767 A1 | 8/2005 | Boland et al. | |
| 2007/0293143 A1 * | 12/2007 | Harris | 455/3.01 |
| 2008/0004045 A1 * | 1/2008 | Srey et al. | 455/458 |
| 2008/0102826 A1 | 5/2008 | Voyer et al. | |
| 2009/0098891 A1 * | 4/2009 | Park et al. | 455/458 |

* cited by examiner

*Primary Examiner* — Jay P Patel

(57) ABSTRACT

A page routing system comprises a communication transceiver and a processing system, wherein a wireless communication network comprises a plurality of paging zones and each of the paging zones comprises a plurality of sectors. The communication transceiver is configured to transmit pages to the paging zones for delivery to wireless communication devices located in the sectors and to receive page responses from the paging zones that were transferred by the wireless communication devices located in the sectors. The processing system is configured to determine page utilization for each of the paging zones, to track the page responses per-sector for each of the wireless communication devices, to receive a new page for one of the wireless communication devices in one of the paging zones, and if the page utilization for the one paging zone exceeds a zone threshold, then to select a target one of the sectors in the one paging zone for page delivery based on the page responses per-sector for the one wireless communication device.

20 Claims, 5 Drawing Sheets

| THRESHOLD LEVEL | FIRST ATTEMPT | SECOND ATTEMPT | THIRD ATTEMPT |
|---|---|---|---|
| PCO > 95% | SECTOR WITH GREATEST PAGE RESPONSE | ALL SECTORS IN PAGING ZONE 305 | ALL PAGING ZONES ON SWITCH 340 |
| PCO > 85% | TOP 2 SECTORS WITH GREATEST PAGE RESPONSE | ALL SECTORS IN PAGING ZONE 305 | ALL PAGING ZONES ON SWITCH 340 |
| PCO > 75% | TOP 3 SECTORS WITH GREATEST PAGE RESPONSE | ALL SECTORS IN PAGING ZONE 305 | ALL PAGING ZONES ON SWITCH 340 |
| PCO < 75% | ALL SECTORS IN PAGING ZONE 305 | PAGING ZONE 305 AND PAGING ZONE 306 | ALL PAGING ZONES ON SWITCH 340 |

ZONE THRESHOLD TABLE 400

FIGURE 4

| DEVICE ID | SECTOR A RESPONSES | SECTOR B RESPONSES | SECTOR C RESPONSES | SECTOR D RESPONSES | SECTOR E RESPONSES | SECTOR F RESPONSES | SECTOR G RESPONSES |
|---|---|---|---|---|---|---|---|
| 301 | 6 | 7 | 9 | 5 | 2 | 1 | 0 |

PAGE RESPONSE TABLE 500

FIGURE 5 ns, including when a large number of users attempt to simultaneously utilize a wireless communication system in excess of capacity, or when a fault occurs that disables a portion of the communication system, for example. In particular, and by way of another example, a paging channel may experience an overload condition when large quantities of paging messages are transferred through the paging channel, resulting in a high degree of page utilization which may reduce the quality of service for users of the wireless communication system.

PAGE ROUTING SYSTEM

TECHNICAL BACKGROUND

Wireless communications have become increasingly prominent for sending and receiving information. For example, individuals may utilize a wireless communication device for voice communications, research, entertainment, or for conducting critical business transactions. To support these services, a wireless communication network may perform communications via forward-link communication channels and reverse-link communication channels. The forward-link communication channels typically carry communications from a wireless access network to wireless communication devices, while the reverse-link communication channels transfer communications from the wireless communication devices to the network. The forward-link channels may include pilot channels, sync channels, forward-traffic channels, and paging channels.

A paging channel is typically used by a network to transmit pages to a wireless communication device to provide a service notification to the device. For example, one type of paging message could comprise a "feature notification" page that is typically used to communicate caller-identification information to a user of a wireless communication device or to notify the user that a voice mail message is available. In other examples, pages could comprise "data burst" paging messages, which are typically used to transfer Short Message Service (SMS) messages to a wireless communication device. Other examples of pages could include "channel assignment" paging messages that are typically used to instruct a wireless communication device to tune to a new frequency and/or channel, and "general page" paging messages that may be used to inform a wireless communication device that a call is available for connection to the device. Other examples and types of pages are also possible.

As the popularity and use of wireless communication systems continues to rise, the chances that a wireless communication system will experience an overload condition also increases. An overload condition may occur for several reasons, including when a large number of users attempt to simultaneously utilize a wireless communication system in excess of capacity, or when a fault occurs that disables a portion of the communication system, for example. In particular, and by way of another example, a paging channel may experience an overload condition when large quantities of paging messages are transferred through the paging channel, resulting in a high degree of page utilization which may reduce the quality of service for users of the wireless communication system.

Overview

A page routing system comprises a communication transceiver and a processing system, wherein a wireless communication network comprises a plurality of paging zones and each of the paging zones comprises a plurality of sectors. The communication transceiver is configured to transmit pages to the paging zones for delivery to wireless communication devices located in the sectors and to receive page responses from the paging zones that were transferred by the wireless communication devices located in the sectors. The processing system is configured to determine page utilization for each of the paging zones and to track the page responses per-sector for each of the wireless communication devices. The processing system is configured to receive a new page for one of the wireless communication devices in one of the paging zones, and if the page utilization for the one paging zone exceeds a zone threshold, then to select a target one of the sectors in the one paging zone for page delivery based on the page responses per-sector for the one wireless communication device. The processing system is configured to transfer the new page indicating the target sector to the one paging zone, wherein the one paging zone responsively transfers the new page to the target sector for delivery to the one wireless communication device.

A method of operating a page routing system is disclosed, wherein a wireless communication network comprises a plurality of paging zones and each of the paging zones comprises a plurality of sectors. The method comprises transmitting pages to the paging zones for delivery to wireless communication devices located in the sectors and to receive page responses from the paging zones that were transferred by the wireless communication devices located in the sectors. The method further comprises determining page utilization for each of the paging zones and tracking the page responses per-sector for each of the wireless communication devices. The method further comprises receiving a new page for one of the wireless communication devices in one of the paging zones, and if the page utilization for the one paging zone exceeds a zone threshold, then selecting a target one of the sectors in the one paging zone for page delivery based on the page responses per-sector for the one wireless communication device. The method further comprises transferring the new page indicating the target sector to the one paging zone, wherein the one paging zone responsively transfers the new page to the target sector for delivery to the one wireless communication device.

BRIEF DESCRIPTION OF THE DRAWINGS

FIG. 4 illustrates a zone threshold table in an exemplary embodiment.

FIG. 5 illustrates a page response table in an exemplary embodiment.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
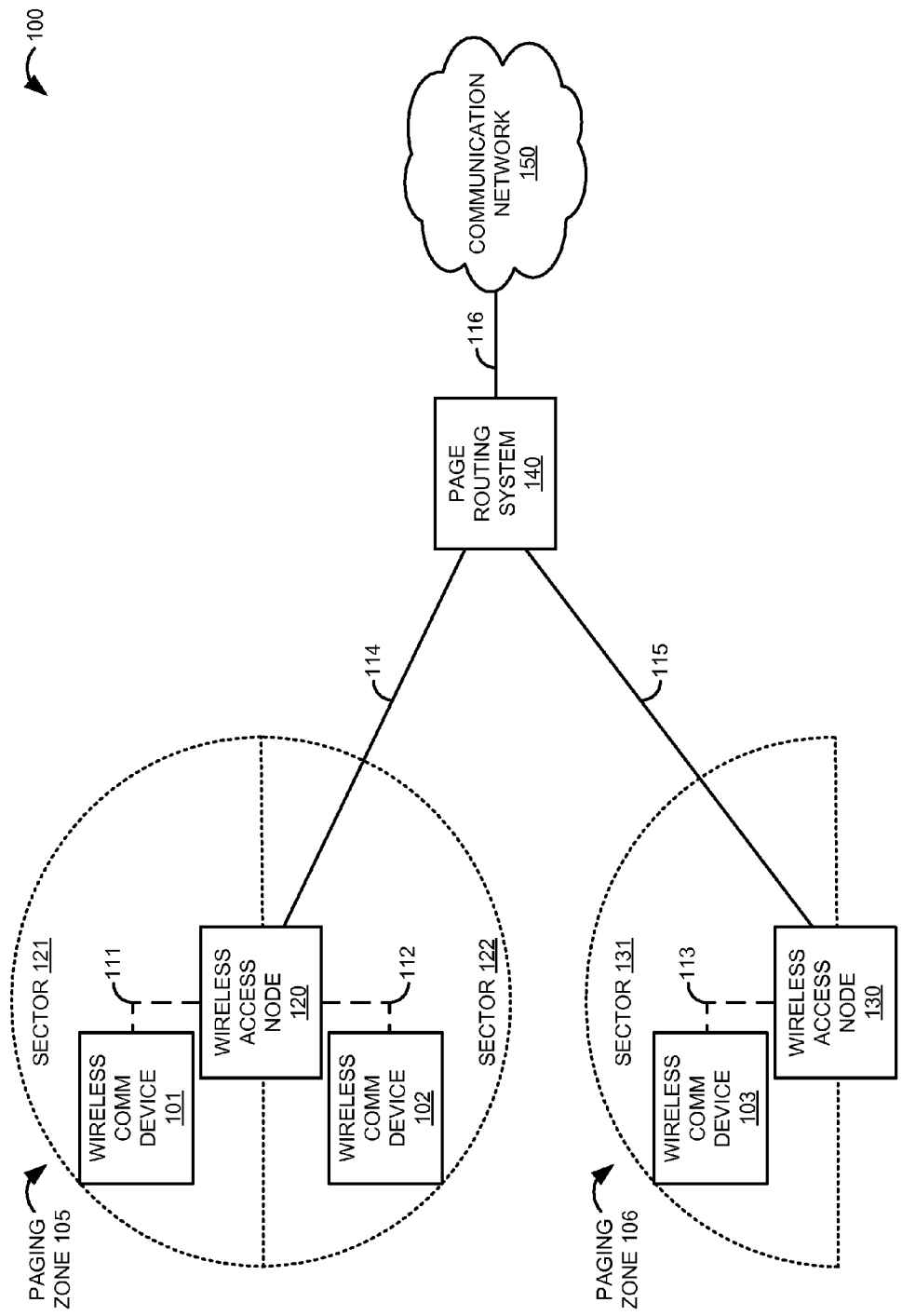
FIG. 1 is a block diagram that illustrates a communication system.

FIG. 1 is a block diagram that illustrates communication system 100. Communication system 100 includes wireless communication devices 101-103, wireless access nodes 120 and 130, page routing system 140, and communication network 150. In FIG. 1, wireless communication devices 101 and 102 and wireless access node 120 are shown within paging zone 105. Likewise, wireless communication device 103 and wireless access node 130 are shown within paging zone 106. Paging zone 105 comprises sectors 121 and 122, while paging zone 106 comprises sector 131. Wireless communication device 101 and wireless access node 120 are in communication over wireless communication link 111 of sector 121, while wireless communication device 102 and wireless access node 120 are in communication over wireless communication link 112 of sector 122. Likewise, wireless communication device 103 and wireless access node 130 are in communication over wireless communication link 113 of sector 131. Wireless access node 120 and page routing system 140 communicate over communication link 114, while wireless access node 130 and page routing system 140 communicate over communication link 115. Page routing system 140 and communication network 150 communicate over communication link 116.

Figure 2:
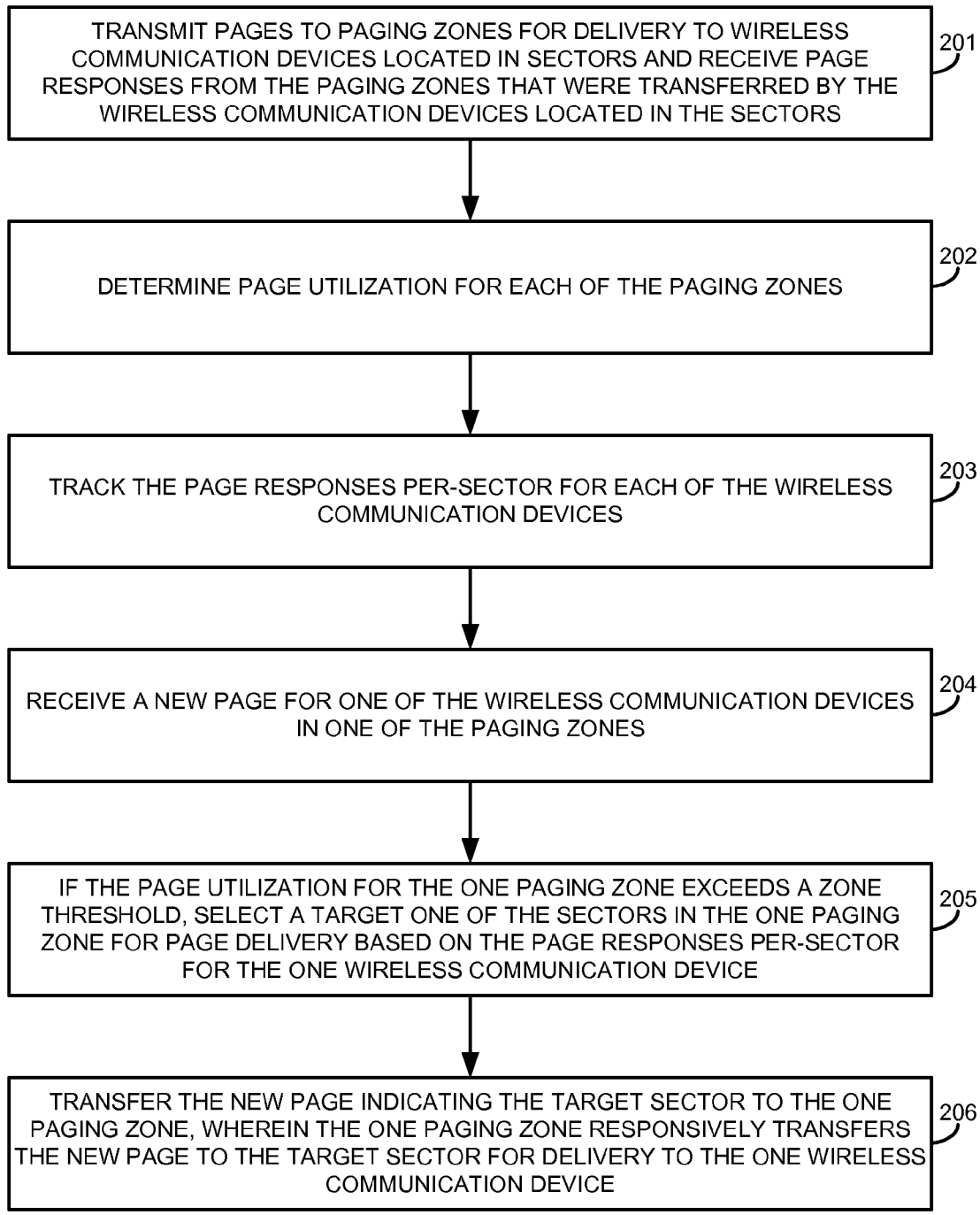
FIG. 2 is a flow diagram that illustrates an operation of the communication system.

FIG. 2 is a flow diagram that illustrates an operation of communication system 100. The steps of the operation are indicated below parenthetically. In FIG. 1, communication system 100 comprises a wireless communication network comprising a plurality of paging zones 105 and 106, and each of the paging zones 105 and 106 comprises a plurality of sectors. In particular, paging zone 105 comprises sectors 121 and 122, and paging zone 106 comprises sector 131.

In FIG. 2, page routing system 140 transmits pages to the paging zones 105 and 106 for delivery to wireless communication devices 101-103 located in the sectors 121, 122, and 131 (201). In order to transmit the pages to the paging zones 105 and 106, page routing system 140 typically instructs wireless access node 120 to broadcast the pages to paging zone 105 for delivery to wireless communication devices 101 and 102 located in sectors 121 and 122, and utilizes wireless access node 130 to broadcast pages to paging zone 106 for delivery to wireless communication device 103 located in sector 131. In response to the pages, page routing system 140 receives page responses from the paging zones 105 and 106 that were transferred by the wireless communication devices 101-103 located in the sectors 121, 122, and 131 (201).

Page routing system 140 determines page utilization for each of the paging zones 105 and 106 (202). The page utilization could be determined in a number of ways, and typically comprises a metric that indicates an amount of utilization of a paging channel associated with a paging zone 105 or 106. For example, page routing system 140 could determine page utilization for each of the paging zones 105 and 106 by determining a paging channel occupancy for each of the paging zones 105 and 106. In some examples, the page utilization may be compared to threshold values (as described in operation 205 below), in which case the page utilization could be measured in compatible units with the applicable threshold. For example, if the page utilization will be compared to a threshold level defining a number of data bytes transmitted over a paging channel during a given time period, then determining page utilization for a paging zone 105 or 106 could comprise measuring the rate at which data bytes are transmitted over a paging channel associated with that paging zone 105 or 106 during the given time period. As another example, if the page utilization will be compared to a threshold value defining a queue level threshold as a percentage of a page queue currently in use, then determining the page utilization for a paging zone 105 or 106 could comprise measuring a percentage of the page queue currently in use for that paging zone 105 or 106, wherein the page queue stores page messages prior to transmission (and/or re-transmission) of the pages over a paging channel. Other examples of determining the page utilization for each paging zone 105 and 106 are also possible and within the scope of this disclosure.

Page routing system 140 also tracks the page responses per-sector for each of the wireless communication devices 101-103 (203). Typically, page routing system 140 tracks the page responses per-sector by tracking a number of the page responses per-sector for each of the wireless communication devices 101-103. For example, if page routing system 140 receives a page response transferred by wireless communication device 101 located in sector 121, page routing system 140 could correlate sector 121 with a page response for wireless communication device 101 in a database or some other data structure. In some examples, page routing system 140 may timestamp the page responses per-sector for each of the wireless communication devices 101-103.

Page routing system 140 then receives a new page for one of the wireless communication devices 101-103 in one of the paging zones 105 and 106 (204). For purposes of this example, the following discussion assumes that page routing system 140 receives a new page for wireless communication device 101 in paging zone 105. The new page could originate from any system, device, or element associated with communication network 150 or some other communication network, including page routing system 140.

Page routing system 140 next determines if the page utilization for the one paging zone 105 exceeds a zone threshold (205). The zone threshold could comprise any threshold level of page utilization for the one paging zone 105. In some examples, page routing system 140 could compare the page utilization for the one paging zone 105 to the zone threshold in order to detect whether an occupancy level of a paging channel for paging zone 105 has reached the zone threshold level of occupancy for that paging zone 105. The zone threshold could also comprise other threshold values for page utilization, such as a queue threshold level that defines a percentage of a page queue currently in use for paging zone 105, a data-rate threshold level that defines a number of data bytes transmitted during a given time period for paging zone 105, and a request-arrival-rate threshold that defines the zone threshold as a number of paging message requests received at page routing system 140 during a given time period. Other examples of zone thresholds for a paging zone 105 or 106 are also possible and within the scope of this disclosure.

If the page utilization for the one paging zone 105 exceeds a zone threshold, page routing system 140 selects a target one of the sectors 121 and 122 in the one paging zone 105 for page delivery based on the page responses per-sector for the one wireless communication device 101 (205). Typically, page routing system 140 attempts to select a target sector 121 or 122 with the highest likelihood of reaching wireless communication device 101 in paging zone 105.

Page routing system 140 could select the target sector 121 or 122 in a number of ways. In some examples, page routing system 140 could select the target one of the sectors 121 or 122 in the one paging zone 105 for page delivery based on a number of the page responses per-sector for the one wireless communication device 101, which is typically assessed during a given time period. For example, if page routing system 140 has received a greatest number of the page responses from sector 121 for wireless communication device 101 during a time period, page routing system 140 could select sector 121 as the target sector for wireless communication device 101, since sector 121 is associated with the greatest number of the page responses per-sector in the one paging zone 105 for wireless communication device 101. In other examples, page routing system 140 could rank the sectors 121 and 122 in the one paging zone 105 based on a number of the page responses per-sector for the one wireless communication device 101, and select the target sector based on a highest rank of the sectors 121 and 122. Further, in examples where page routing system 140 timestamps the page responses per-sector for each of the wireless communication devices 101-103, page routing system 140 could select the target sector 121 or 122 from a group of recent page responses from wireless communication device 101 in the one paging zone 105 during a time period based on the timestamps. For example, page routing system 140 could select the target sector for wireless communication device 101 as the sector 121 or 122 associated with a most recent page response received from wireless communication device 101 in the one paging zone 105.

In some examples, page routing system 140 could select multiple target sectors in response to the page utilization for a paging zone 105 or 106 exceeding a threshold level. For example, page routing system 140 could receive another page for wireless communication device 101 in paging zone 105, and if the page utilization for paging zone 105 exceeds a second threshold, but does not exceed the zone threshold, then page routing system 140 could select two or more of the sectors 121 and 122 in paging zone 105 for page delivery based on the page responses per-sector for the one wireless communication device 101. In some examples, the zone threshold is greater than the second threshold.

Once the target sector 121 or 122 is selected, page routing system 140 transfers the new page indicating the target sector to the one paging zone 105, wherein the one paging zone 105 responsively transfers the new page to the target sector 121 or 122 for delivery to the one wireless communication device 101 (206). For purposes of this example, page routing system 140 selects sector 121 as the target sector in paging zone 105 for wireless communication device 101. Therefore, paging zone 105 receives the new page for wireless communication device 101 from page routing system 140 and transfers the new page to the target sector 121 for delivery to wireless communication device 101. Advantageously, since the target sector 121 is selected based on historical page responses per-sector for the wireless communication device 101 being paged in paging zone 105, there is some theoretical degree of likelihood that the new page will be received by wireless communication device 101 in paging zone 105 via the target sector 121. In this manner, page routing system 140 can target specific sectors that are likely to be received by a particular wireless communication device 101, while simultaneously reducing page utilization for the paging zone 105 when the zone threshold for paging zone 105 is exceeded.

Referring back to FIG. 1, each wireless communication device 101-103 could comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101-103 may also include a user interface, memory device, software, processing circuitry, or some other communication components. For example, wireless communication devices 101-103 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101-103 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication devices 101-103 and wireless access nodes 120 and 130.

Wireless access nodes 120 and 130 each comprise RF communication circuitry and an antenna. The RF communication circuitry typically includes an amplifier, filter, RF modulator, and signal processing circuitry. Wireless access nodes 120 and 130 may also comprise a router, server, memory device, software, processing circuitry, cabling, power supply, network communication interface, structural support, or some other communication apparatus. Wireless access nodes 120 and 130 could comprise a base station, Internet access node, telephony service node, wireless data access point, or some other wireless communication system—including combinations thereof. Some examples of wireless access nodes 120 and 130 include a base transceiver station (BTS), base station controller (BSC), radio base station (RBS), Node B, enhanced Node B (eNode B), and others. Wireless network protocols that may be utilized by wireless access nodes 120 and 130 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Page routing system 140 comprises a processing system and communication transceiver. Page routing system 140 may also include other components such as a router, server, data storage system, and power supply. Page routing system 140 may reside in a single device or may be distributed across multiple devices. Page routing system 140 may be a discrete system or may be integrated within other systems—including other systems within communication system 100. In some examples, page routing system 140 could comprise a network switch, mobile switching center, router, switching system, packet gateway, network gateway system, Internet access node, application server, service node, firewall, or some other communication system—including combinations thereof.

Communication network 150 comprises the core network of a wireless communication provider, and could include routers, gateways, telecommunication switches, servers, processing systems, or other communication equipment and systems for providing communication and data services. Communication network 150 could comprise wireless communication nodes, telephony switches, Internet routers, network gateways, computer systems, communication links, or some other type of communication equipment—including combinations thereof. Communication network 150 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 150 may be configured to communicate over metallic, wireless, or optical links. Communication network 150 may be configured to use time-division multiplexing (TDM), Internet Protocol (IP), Ethernet, optical networking, wireless protocols, communication signaling, or some other communication format—including combinations thereof. In some examples, communication network 150 includes further access nodes and associated equipment for providing communication services to many wireless communication devices across a large geographic region.

Paging zones 105 and 106 comprise geographic areas with approximate boundary lines as indicated by the dotted lines on FIG. 1, which are typically defined by page routing system 140 and/or communication network 150. Each paging zone 105 and 106 is subdivided into a number of sections, designated by the dotted lines within paging zone 105 as sectors 121 and 122, and within paging zone 106 as sector 131. Wireless access node 120 serves sectors 121 and 122 in paging zone 105, and wireless access node 130 serves sector 131 in paging zone 106. For example, each sector 121 and 122 served by wireless access node 120 within paging zone 105 may be served by separate antennas of wireless access node 120, providing each sector 121 and 122 a separate direction of tracking of roughly 180 degrees with respect to the adjacent sector. In some examples, paging zones 105 and 106 could comprise cells, although paging zones 105 and 106 could each comprise multiple cells and/or multiple sectors served by a plurality of wireless access nodes within a single paging zone.

Wireless communication links 111-113 use the air or space as the transport medium. Wireless communication links 111-113 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication links 111-113 may each comprise many different signals sharing the same link. For example, wireless communication links 111-113 could include multiple signals operating in a single propagation path comprising multiple communication sessions, frequencies, timeslots, transportation ports, logical transportation links, network sockets, IP sockets, packets, or communication directions—including combinations thereof.

Communication links 114-116 use metal, air, space, optical fiber such as glass or plastic, or some other material as the transport media—including combinations thereof. Communication links 114-116 could use various communication protocols, such as TDM, IP, Ethernet, telephony, optical networking, hybrid fiber coax (HFC), communication signaling, wireless protocols, or some other communication format—including combinations thereof. Communication links 114-116 may be direct links or could include intermediate networks, systems, or devices.

Figure 3:
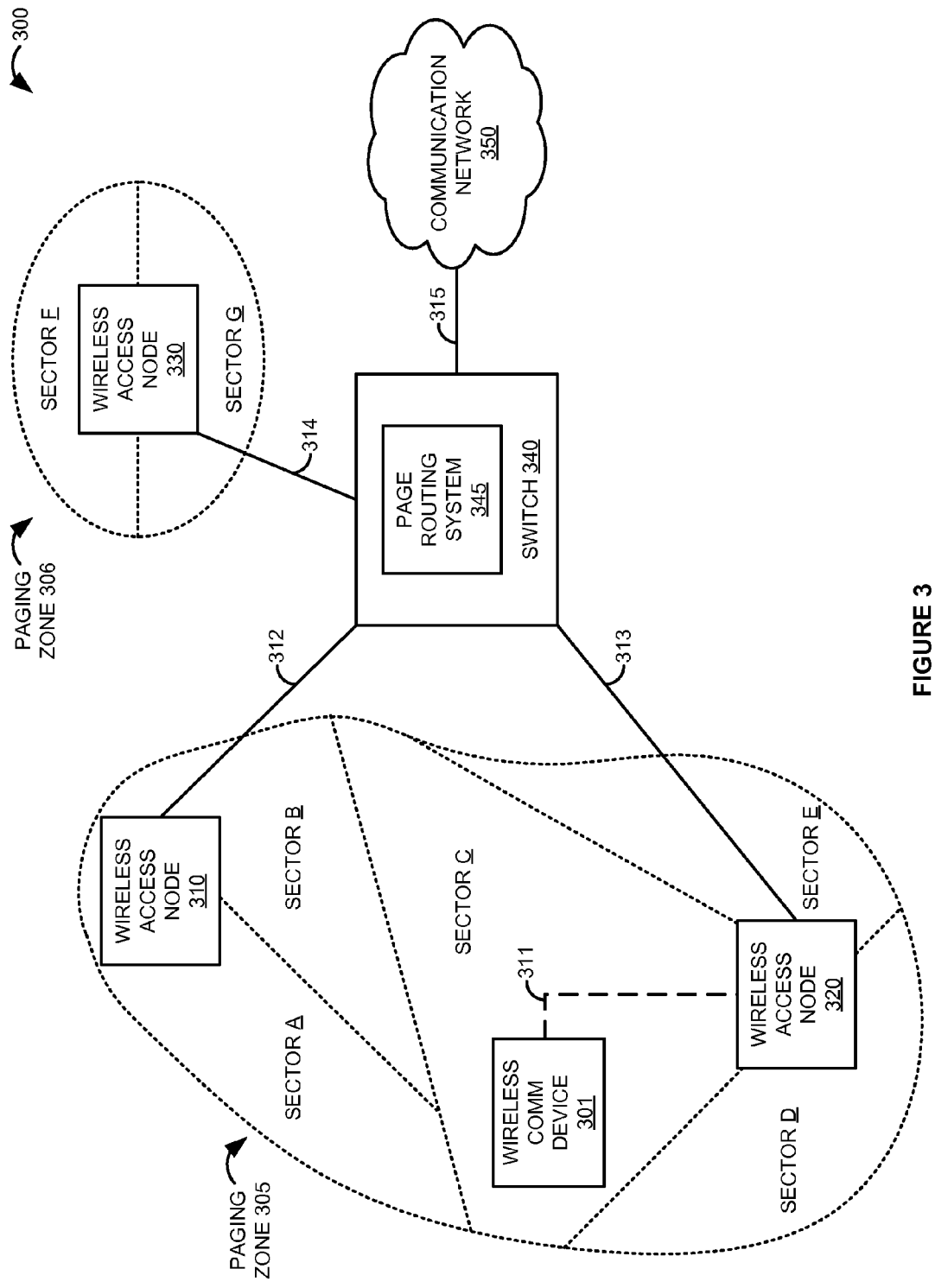
FIG. 3 is a block diagram that illustrates a communication system in an exemplary embodiment.

FIG. 3 is a block diagram that illustrates communication system 300. Communication system 300 includes wireless communication device 301, wireless access nodes 310, 320, and 330, switch 340, and communication network 350. Switch 340 includes page routing system 345, which could comprise a software module configured to execute on switch 340 in some examples. Additionally or alternatively, page routing system 345 could comprise hardware and circuitry comprising a subsystem of switch 340 in some examples. In FIG. 3, wireless communication device 301 and wireless access nodes 310 and 320 are shown within paging zone 305. Paging zone 305 comprises sectors A, B, C, D, and E, which are designated by the dotted lines within paging zone 305. Wireless access node 330 is shown within paging zone 306, which serves sectors F and G of paging zone 306. As shown in FIG. 3, wireless communication device 301 and wireless access node 320 are presently in communication over wireless communication link 311 of sector C, but device 301 and wireless access nodes 310, 320, and 330 could communicate over similar wireless links (not shown) depending on the location of wireless communication device 301. Wireless access node 310 and switch 340 communicate over communication link 312, wireless access node 320 and switch 340 communicate over communication link 313, and wireless access node 330 and switch 340 are in communication over communication link 314. Switch 340 and communication network 350 communicate over communication link 315. In some examples, switch 340 could comprise a mobile switching center.

FIG. 4 illustrates zone threshold table 400 in an exemplary embodiment. Zone threshold table 400 comprises an exemplary data structure that shows several zone threshold values for switch 340. While the zone thresholds shown in zone threshold table 400 could be stored in a database or some other storage system, the zone thresholds could also comprise machine program instructions configured to execute on switch 340 and/or page routing system 345, which could be hardcoded into switch 340.

Zone threshold table 400 includes columns labeled THRESHOLD LEVEL, FIRST ATTEMPT, SECOND ATTEMPT, and THIRD ATTEMPT. Each row in table 400 represents related data, such that the instructions for the first, second, and third attempts in a row correspond to the threshold level in that row. The first row provides instructions for paging attempts when the paging channel occupancy (PCO) is greater than 95%. In this case, the paging channel of switch 340 is heavily utilized and congested, so when switch 340 first attempts to page a wireless communication device when the PCO is greater than 95%, switch 340 sends the page to a sector with the greatest page response for the device being paged during a time period. If no response is received, switch 340 performs a second attempt to page the wireless device by transferring the page to all sectors A-E in paging zone 305. If no response is received after the second attempt, switch 340 transfers the page to all paging zones on switch 340 in a third attempt.

The second row of zone threshold table 400 provides a threshold level of PCO greater than 85%. In this case, the PCO is not as congested as the first row threshold level when the PCO is greater than 95%, but is still heavily utilized at 85% occupancy. Thus, when switch 340 first attempts to page a wireless communication device when the PCO is greater than 85%, switch 340 sends the page to the top two sectors with the greatest page response for the device being paged during a time period. If no response is received to the first attempt, switch 340 performs second and third attempts in a similar manner the 95% threshold level. Thus, switch 340 transfers the page to all sectors A-E in paging zone 305 in a second attempt to page the wireless device, and if no response is received after the second attempt, switch 340 transfers the page to all paging zones on switch 340 in a third attempt.

The third row of zone threshold table 400 provides a threshold level of PCO greater than 75%. The 75% threshold level instructs switch 340 to first attempt paging a wireless communication device by transferring a page to the top three sectors with the greatest page response for the device being paged during a time period. If no response is received to the first attempt, switch 340 performs second and third attempts in a similar manner to the 85% and 95% threshold levels. Therefore, switch 340 transfers the page to all sectors A-E in paging zone 305 in a second attempt to page the wireless device, and if no response is received after the second attempt, switch 340 transfers the page to all paging zones on switch 340 in a third attempt.

The fourth row of zone threshold table 400 provides a threshold level of PCO less than 75%. In this case, the paging channel of switch 340 has enough free occupancy to accommodate a typical or default zone paging scheme. In this example, the default zone paging scheme when the PCO for switch 340 is less than 75% is to first page all sectors in paging zone 305 in a first attempt. If no response is received to the first attempt, switch 340 performs a second attempt by transferring the page to all sectors A-E in paging zone 305 and all sectors F and G in paging zone 306. If no response to the second page attempt is received from the wireless communication device, the third attempt instructs switch 340 to page the device by transferring the page to all paging zones on switch 340, which could include paging zones not shown on FIG. 3 in addition to the paging zones 305 and 306 that are shown. Of course, one of skill in the art will understand that the threshold levels could be different values than the ones shown in zone threshold table 400, and that fewer or greater threshold levels could be used.

FIG. 5 illustrates page response table 500 in an exemplary embodiment. Page response table 500 comprises an exemplary data structure that shows a number of previous page responses per-sector for wireless communication device 301. Typically, the page responses shown in page response table 500 are populated by switch 340 or page routing system 345 when responses to pages are received from sectors A-G for a particular wireless communication device 301. Additional wireless communication devices and their associated page responses per-sector would also typically be stored in page response table 500, but are not shown for clarity. In some examples, the information in page response table 500 could be stored in a database or some other storage system of communication network 350, or could be stored within switch 340 and/or page routing system 345.

Page response table 500 comprises a first column labeled DEVICE ID and remaining columns to the right labeled SECTOR A RESPONSES through SECTOR G RESPONSES. The row in table 500 represents related data, such that the number of responses listed in the second through seventh columns are associated with wireless communication device 301 as identified by the "DEVICE ID" column. To populate page response table 500, switch 340 has tracked a number of page responses for wireless communication device 301 per-sector for sectors A through G in paging zones 305 and 306 during a predetermined time period, such as 60 minutes. As shown in page response table 500, switch 340 has received zero page responses from sector G for wireless communication device 301 and one response from sector F of paging zone 306 for device 301 during the time period. Regarding paging zone 305, switch 340 has received six page responses from sector A, seven responses from sector B, nine responses from sector C, five responses from sector D, and two responses from sector E for wireless communication device 301.

Page routing system 345 utilizes the information in page response table 500 in conjunction with the threshold levels shown in zone threshold table 400 of FIG. 4 to page wireless communication device 301. For example, when a new page is received for wireless communication device 301 at switch 340, page routing system 345 compares the present PCO for switch 340 to the threshold levels in zone threshold table 400 to determine the appropriate course of action for paging device 301, and then utilizes page response table 500 to determine a sector or sectors A-G to which the new page should first be transferred. In this example, assuming that page routing system 345 determines that the paging channel occupancy is greater than 75% but less than 85%, page routing system 345 would instruct switch 340 to first attempt to transfer the new page to the top three sectors with the greatest number of page responses tracked during the time period. According to page response table 500, wireless communication device 301 has responded to pages from sector C the greatest number of times with nine responses, from sector B the second greatest number of times with seven responses, and from sector A the third greatest number of times with six page responses. Thus, switch 340 would transfer the new page to sectors A, B, and C of paging zone 305 in a first attempt to page wireless communication device 301 when the PCO is greater than 75% but less than 85%. If switch 340 receives no response to the first attempt to page device 301, switch 340 would then transfer the page to all sectors A-E in paging zone 305 for delivery to wireless communication device 301 as instructed by the field at the intersection of the "PCO>75%" row and the "SECOND ATTEMPT" column of zone threshold table 400. Finally, if switch 340 does not receive a response to the second page attempt, switch 340 would broadcast the new page for device 301 to all paging zones 305 and 306 on switch 340 in a third attempt.

By utilizing the information in tables 400 and 500, page routing system 345 and switch 340 can dynamically alter the paging scheme used to page wireless communication device 301 based on the paging channel occupancy for switch 340 when the page is transferred for delivery to device 301. In this manner, a balance is struck between alleviating paging channel congestion while maintaining a high likelihood that a page will reach wireless communication device 301 and a successful page response will be received from device 301. In some examples, the threshold levels shown in zone threshold table 400 of FIG. 4 could be dynamically determined based on network conditions or other factors. Also, in some examples, different threshold levels could apply depending on the type of paging message to be transferred to wireless communication device 301. Some examples of different types of paging messages include "feature notification" paging messages that are typically used communicate caller-identification information to a user of device 301 or that a voice mail message is available, "data burst" paging messages that are typically used to transfer Short Message Service (SMS) messages to device 301, "channel assignment" paging messages that are typically used to instruct a wireless communication device 301 to tune to a new frequency and/or channel, and "general page" paging messages that may be used to inform device 301 that a call is available for connection to device 301. Other examples and types of paging messages are also possible.

Figure 6:
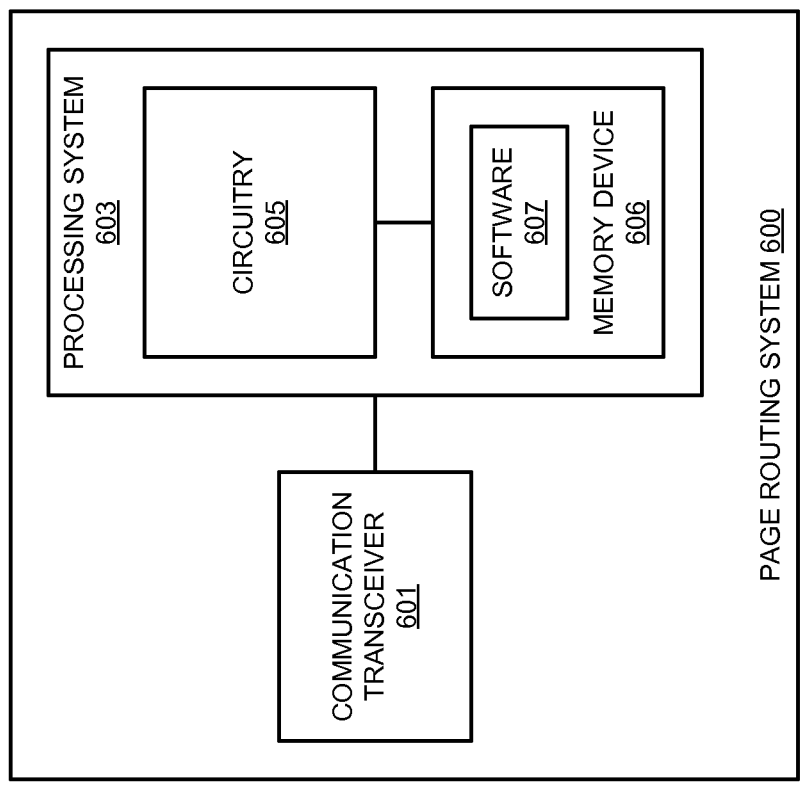
FIG. 6 is a block diagram that illustrates a page routing system.

FIG. 6 is a block diagram that illustrates page routing system 600. Page routing system 600 provides an example of page routing system 140, although system 140 may use alternative configurations. Page routing system 600 comprises communication transceiver 601 and processing system 603. Processing system 603 is linked to communication transceiver 601. Processing system 603 includes processing circuitry 605 and memory device 606 that stores operating software 607.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof. Communication transceiver 601 is configured to a transmit pages to paging zones for delivery to wireless communication devices located in sectors of the paging zones and to receive page responses from the paging zones that were transferred by the wireless communication devices located in the sectors. In addition, communication transceiver 601 could also be configured to transfer a new page indicating a target sector to a paging zone.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software.

When executed by circuitry 605, operating software 607 directs processing system 603 to operate as described herein for page routing system 140. In particular, operating software 607 may direct processing system 603 to direct communication transceiver 601 to transmit pages to paging zones for delivery to wireless communication devices located in a plurality of sectors and to receive page responses from the paging zones that were transferred by the wireless communication devices located in the sectors. Further, operating software 607 may direct processing system 603 to determine page utilization for each of the paging zones and to track the page responses per-sector for each of the wireless communication devices. In addition, operating software 607 may direct processing system 603 to receive a new page for one of the wireless communication devices in one of the paging zones, and if the page utilization for the one paging zone exceeds a zone threshold, then to select a target one of the sectors in the one paging zone for page delivery based on the page responses per-sector for the one wireless communication device, and to transfer the new page indicating the target sector to the one paging zone, wherein the one paging zone responsively transfers the new page to the target sector for delivery to the one wireless communication device.

In some examples, operating software 607 could comprise a page messaging software module that transmits pages to paging zones for delivery to wireless communication devices located in a plurality of sectors and receives page responses from the paging zones that were transferred by the wireless communication devices located in the sectors. Additionally, operating software 607 could comprise a page tracking software module that determines page utilization for each of the paging zones and tracks the page responses per-sector for each of the wireless communication devices. Operating software 607 could also comprise a threshold analysis software module that receives a new page for one of the wireless communication devices in one of the paging zones, and if the page utilization for the one paging zone exceeds a zone threshold, then selects a target one of the sectors in the one paging zone for page delivery based on the page responses per-sector for the one wireless communication device. Further, operating software 607 could comprise a target sector page messaging software module that transfers the new page indicating the target sector to the one paging zone, wherein the one paging zone responsively transfers the new page to the target sector for delivery to the one wireless communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A page routing system wherein a wireless communication network comprises a plurality of paging zones and each of the paging zones comprises a plurality of sectors, the page routing system comprising:
   a communication transceiver configured to transmit pages to the paging zones for delivery to wireless communication devices located in the sectors and to receive page responses from the paging zones that were transferred by the wireless communication devices located in the sectors;
   a processing system configured to determine page utilization for each of the paging zones and to track the page responses per-sector for each of the wireless communication devices;
   the processing system configured to receive a new page for one of the wireless communication devices in one of the paging zones, and if the page utilization for the one paging zone exceeds a zone threshold, then to select a target one of the sectors in the one paging zone for page delivery based on the page responses per-sector for the one wireless communication device; and
   the processing system configured to transfer the new page indicating the target sector to the one paging zone, wherein the one paging zone responsively transfers the new page to the target sector for delivery to the one wireless communication device.

2. The page routing system of claim 1 further comprising:
   the processing system configured to receive another page for the one of the wireless communication devices in the one of the paging zones, and if the page utilization for the one paging zone exceeds a second threshold, then to select two or more of the sectors in the one paging zone for page delivery based on the page responses per-sector for the one wireless communication device; and
   the processing system configured to transfer the other page indicating the two or more sectors to the one paging zone, wherein the one paging zone responsively transfers the other page to the two or more sectors for delivery to the one wireless communication device.

3. The page routing system of claim 2 wherein the zone threshold is greater than the second threshold.

4. The page routing system of claim 1 wherein the processing system configured to track the page responses per-sector for each of the wireless communication devices comprises the processing system configured to track a number of the page responses per-sector for each of the wireless communication devices.

5. The page routing system of claim 4 wherein the processing system configured to select the target one of the sectors in the one paging zone for page delivery based on the page responses per-sector for the one wireless communication device comprises the processing system configured to select the target one of the sectors in the one paging zone for page delivery based on the number of the page responses per-sector for the one wireless communication device.

6. The page routing system of claim 1 wherein the processing system configured to select the target one of the sectors in the one paging zone for page delivery based on the page responses per-sector for the one wireless communication device comprises the processing system configured to select the target sector associated with a greatest number of the page responses per-sector of the sectors in the one paging zone.

7. The page routing system of claim 1 wherein the processing system configured to select the target one of the sectors in the one paging zone for page delivery based on the page responses per-sector for the one wireless communication device comprises the processing system configured to rank the sectors based on a number of the page responses per-sector and select the target sector based on a highest rank of the sectors.

8. The page routing system of claim 1 wherein the processing system configured to determine the page utilization for each of the paging zones comprises the processing system configured to determine a paging channel occupancy for each of the paging zones.

9. The page routing system of claim 1 wherein the routing system comprises a mobile switching center.

10. The page routing system of claim 1 wherein the plurality of sectors comprise base station coverage areas.

11. A method of operating a page routing system, wherein a wireless communication network comprises a plurality of paging zones and each of the paging zones comprises a plurality of sectors, the method comprising:
transmitting pages to the paging zones for delivery to wireless communication devices located in the sectors and to receive page responses from the paging zones that were transferred by the wireless communication devices located in the sectors;
determining page utilization for each of the paging zones and tracking the page responses per-sector for each of the wireless communication devices;
receiving a new page for one of the wireless communication devices in one of the paging zones, and if the page utilization for the one paging zone exceeds a zone threshold, then selecting a target one of the sectors in the one paging zone for page delivery based on the page responses per-sector for the one wireless communication device; and
transferring the new page indicating the target sector to the one paging zone, wherein the one paging zone responsively transfers the new page to the target sector for delivery to the one wireless communication device.

12. The method of claim 11 further comprising:
receiving another page for the one of the wireless communication devices in the one of the paging zones, and if the page utilization for the one paging zone exceeds a second threshold, then selecting two or more of the sectors in the one paging zone for page delivery based on the page responses per-sector for the one wireless communication device; and
transferring the other page indicating the two or more sectors to the one paging zone, wherein the one paging zone responsively transfers the other page to the two or more sectors for delivery to the one wireless communication device.

13. The method of claim 12 wherein the zone threshold is greater than the second threshold.

14. The method of claim 11 wherein tracking the page responses per-sector for each of the wireless communication devices comprises tracking a number of the page responses per-sector for each of the wireless communication devices.

15. The method of claim 14 wherein selecting the target one of the sectors in the one paging zone for page delivery based on the page responses per-sector for the one wireless communication device comprises selecting the target one of the sectors in the one paging zone for page delivery based on the number of the page responses per-sector for the one wireless communication device.

16. The method of claim 11 wherein selecting the target one of the sectors in the one paging zone for page delivery based on the page responses per-sector for the one wireless communication device comprises selecting the target sector associated with a greatest number of the page responses per-sector of the sectors in the one paging zone.

17. The method of claim 11 wherein selecting the target one of the sectors in the one paging zone for page delivery based on the page responses per-sector for the one wireless communication device comprises ranking the sectors based on a number of the page responses per-sector and selecting the target sector based on a highest rank of the sectors.

18. The method of claim 11 wherein determining the page utilization for each of the paging zones comprises determining a paging channel occupancy for each of the paging zones.

19. The method of claim 11 wherein the routing system comprises a mobile switching center.

20. A non-transitory computer-readable hardware medium for a page routing system wherein a wireless communication network comprises a plurality of paging zones and each of the paging zones comprises a plurality of sectors, the computer-readable hardware medium comprising program instructions stored thereon which, when executed by a processing system of the page routing system, direct the page routing system to:
transmit pages to the paging zones for delivery to wireless communication devices located in the sectors and receive page responses from the paging zones that were transferred by the wireless communication devices located in the sectors;
determine page utilization for each of the paging zones and track the page responses per-sector for each of the wireless communication devices;
receive a new page for one of the wireless communication devices in one of the paging zones, and if the page utilization for the one paging zone exceeds a zone threshold, then select a target one of the sectors in the one paging zone for page delivery based on the page responses per-sector for the one wireless communication device; and
transfer the new page indicating the target sector to the one paging zone, wherein the one paging zone responsively transfers the new page to the target sector for delivery to the one wireless communication device.

* * * * *